US011501159B2

(12) United States Patent
Wu et al.

(10) Patent No.: US 11,501,159 B2
(45) Date of Patent: Nov. 15, 2022

(54) METHODS AND SYSTEMS FOR TEXT SEQUENCE STYLE TRANSFER BY TWO ENCODER DECODERS

(71) Applicant: ALIBABA GROUP HOLDING LIMITED, George Town (KY)

(72) Inventors: Shanchan Wu, San Mateo, CA (US); Qiong Zhang, San Mateo, CA (US); Luo Si, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 904 days.

(21) Appl. No.: 16/365,637

(22) Filed: Mar. 26, 2019

(65) Prior Publication Data

US 2020/0311538 A1    Oct. 1, 2020

(51) Int. Cl.
*G06N 3/08* (2006.01)
*G06N 3/04* (2006.01)
(52) U.S. Cl.
CPC .............. *G06N 3/08* (2013.01); *G06N 3/0445* (2013.01); *G06N 3/0454* (2013.01)
(58) Field of Classification Search
CPC ....................................................... G06N 3/08
See application file for complete search history.

(56) References Cited

U.S. PATENT DOCUMENTS 10,853,579 B2 * 12/2020 Laxman ............... G06N 3/0445
10,860,629 B1 * 12/2020 Gangadharaiah ... G06F 16/3329
2018/0189274 A1 * 7/2018 Noh ......................... G06F 40/10
2019/0057683 A1 * 2/2019 Sak ......................... G10L 15/16
2019/0251165 A1 * 8/2019 Bachrach ............... G06N 3/084
2019/0278857 A1 * 9/2019 Ni ........................... G06N 3/0445
2019/0286950 A1 * 9/2019 Kiapour ............... G06K 9/6256
2019/0287012 A1 * 9/2019 Celikyilmaz ........ G06N 3/0445
2020/0065653 A1 * 2/2020 Meier ................. G06K 9/6267
2020/0097554 A1 * 3/2020 Rezagholizadeh .. G06N 3/0472
2021/0004541 A1 * 1/2021 Saito ...................... G06F 40/30
2021/0406483 A1 * 12/2021 Suzuki .................... G06F 40/58
2022/0067519 A1 * 3/2022 Mishra ................ G06V 10/751

* cited by examiner

*Primary Examiner* — Olisa Anwah
(74) *Attorney, Agent, or Firm* — Finnegan, Henderson, Farabow, Garrett & Dunner, LLP

(57) ABSTRACT

A method for text sequence style transfer by two encoder-decoders, including generating, by a first encoder-decoder network model, an output sequence based on a first input sequence and an input sequence style, wherein the output sequence is associated with a second sequence, generating, by a second-encoder decoder network model, a prediction of the first input sequence based on the first input sequence, the output sequence, and a first input sequence style associated with the first input sequence, generating, by a classifier, a prediction of the first input sequence style based on the prediction of the first input sequence, and updating the neural network model based on comparisons between the output sequence and the second sequence, between the prediction of the first input sequence and the first input sequence, and between the prediction of the first input sequence style and the first input sequence style.

18 Claims, 7 Drawing Sheets

METHODS AND SYSTEMS FOR TEXT SEQUENCE STYLE TRANSFER BY TWO ENCODER DECODERS

BACKGROUND

The rise of machine learning is unlocking the potential of data. Many companies have developed machine-learning platforms that derive more meaning out of data. Machine-learning tools are constantly being developed to build more powerful applications in all types of environments. For example, machine learning solutions are being applied to machine translation and other natural language generation (NLG) tasks, like chatbots, summarization, etc.

With the development of natural language generation, most of the existing method rely on an abundance of training pairs to achieve good results. However, the labeling costs involved in preparing the training data are typically very high for sequence-to-sequence related tasks.

Furthermore, for the task of style transfer, the pairs of sentences with different styles but similar meaning are even more scarce and difficult to acquire. This further increases the already high costs involved in preparing the training data.

SUMMARY

The present disclosure provides a method for training a neural network model. The method includes generating, by a first encoder-decoder network model, an output sequence based on a first input sequence and an input sequence style, wherein the output sequence is associated with a second sequence, generating, by a second-encoder decoder network model, a prediction of the first input sequence based on the first input sequence, the output sequence, and a first input sequence style associated with the first input sequence, generating, by a classifier, a prediction of the first input sequence style based on the prediction of the first input sequence, and updating the neural network model based on comparisons between the output sequence and the second sequence, between the prediction of the first input sequence and the first input sequence, and between the prediction of the first input sequence style and the first input sequence style.

Consistent with some embodiments, the present disclose provides a method for text sequence style transfer by two encoder-decoders of a neural network model. The method includes generating, by a trained first encoder-decoder network model, an output sequence based on a first input sequence and a first input sequence style, wherein the output sequence is associated with a second sequence and generating, by a trained second encoder-decoder network model, a target sequence based on the first input sequence, the output sequence, and a target sequence style associated with the target sequence.

Consistent with some embodiments, the present disclosure also provides a system for training a neural network model. The system includes a first encoder-decoder network model configured to generate an output sequence based on a first input sequence and an input sequence style, wherein the output sequence is associated with a second sequence, a second encoder-decoder network model configured to generate a prediction of the first input sequence based on the first input sequence, the output sequence, and a first input sequence style associated with the first input sequence, and a classifier configured to generate a prediction of the first input sequence style based on the prediction of the first input sequence; wherein the neural network model is updated based on comparisons between the output sequence and the second sequence, between the prediction of the first input sequence and the first input sequence, and between the prediction of the first input sequence style and the first input sequence style.

Consistent with some embodiments, the present disclosure also provides a system for text sequence style transfer by two encoder-decoders of a neural network model. The system includes a trained first encoder-decoder network model configured to generate an output sequence based on a first input sequence and an input sequence style, wherein the output sequence is associated with a second sequence and a trained second encoder-decoder network model configured to generate a target sequence based on the first input sequence, the output sequence, and a target sequence style associated with the target sequence.

Additional features and advantages of the disclosed embodiments will be set forth in part in the following description, and in part will be apparent from the description, or may be learned by practice of the embodiments. The features and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate embodiments consistent with the invention and, together with the description, explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

In conventional systems with sequence-to-sequence style transfer using natural language generation, the labeling costs involved in preparing training data are very high, and pairs of sentences with different styles but similar meaning are very scarce and difficult to acquire. This leads to a bottleneck when preparing training data and severely limits the capabilities of sequence-to-sequence style transfer.

Embodiments of the present disclosure are directed to methods and systems for text sequence style transfer by two encoder-decoders. For example and without limitation, embodiments of the present disclosure use two encoder-decoders operating on two sequences with related logic to train a machine learning model to more accurately transfer a sequence style from one sequence to another.

Figure 1:
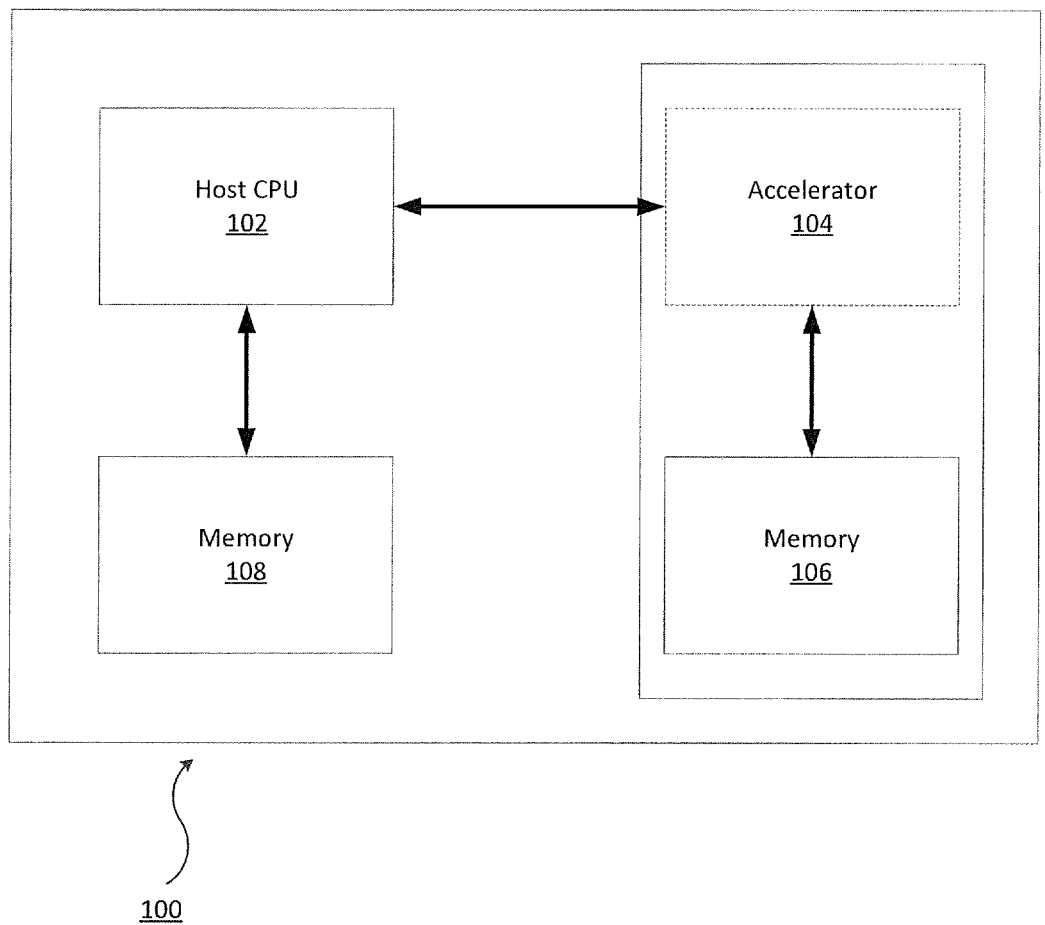
FIG. 1 illustrates a block diagram of an exemplary accelerator system, consistent with some embodiments of the disclosure.

FIG. 1 illustrates a block diagram of an exemplary deep learning accelerator system 100, according to embodiments of the disclosure. Deep learning accelerator system 100 may include an accelerator 104, an accelerator memory 106, a host CPU 102, a host memory 108 associated with host CPU 102.

As illustrated in FIG. 1, accelerator 104 may be connected to host CPU 102 through a peripheral interface. As referred to herein, accelerator 104 may be a computing device for accelerating neural network computing tasks (e.g., such as a neural network processing unit (NPU), a graphic processing unit (GPU), field programmable gate arrays (FPGA), a Tensor processing unit (TPU), etc.). In some embodiments, accelerator 104 can include one or more Long Short-Term Memory (LSTM) cells, which is further described below. Accelerator 104 may be configured to be used as a co-processor (e.g. co-processor 208) of host CPU 102. Each of the host CPU 102 and accelerator 104 can be associated with its own memory device (e.g., memory 108 and 106). In some embodiments, accelerator 104 can be implemented by a heterogeneous acceleration chip where processing units do not have equal processing performance with each other.

In some embodiments, accelerator 104 may comprise a compiler (not shown). The compiler may be a program or a computer software that transforms computer code written in one programming language into accelerator instructions to create an executable program. In machining applications, a compiler may perform a variety of operations, for example, pre-processing, lexical analysis, parsing, semantic analysis, conversion of input programs to an intermediate representation, code optimization, code generation, or combinations thereof.

In some embodiments, the compiler may be on a host unit (e.g., host CPU 102 or host memory 108 of FIG. 1), configured to push one or more commands to accelerator 104. Based on these commands, a task manager may assign any number of tasks to one or more processing elements. Some of the commands may instruct a DMA unit of accelerator (e.g., DMA unit 506 of FIG. 5) to load instructions and data from host memory (e.g., memory 108 or off-chip memory 502 of FIG. 5) into a global memory. The loaded instructions may then be distributed to each processing element assigned with the corresponding task, and the one or more processing elements may process these instructions.

Figure 2:
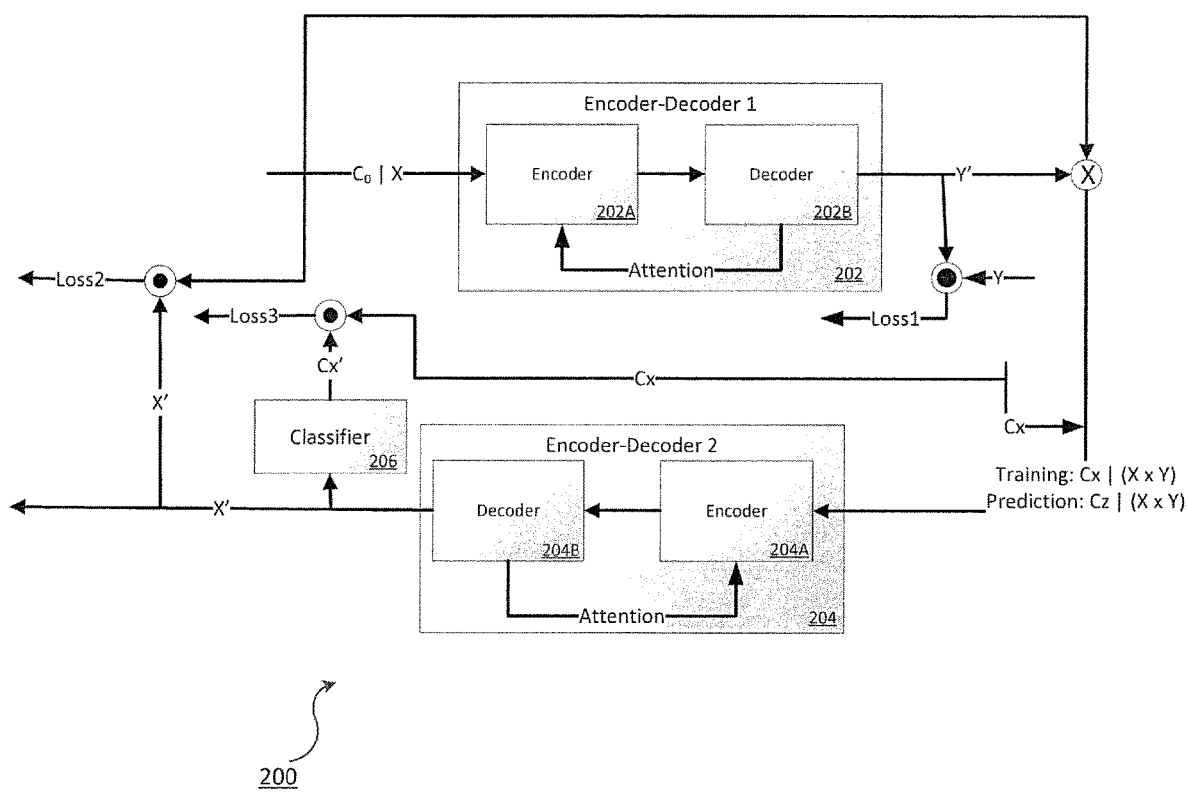
FIG. 2 illustrates a block diagram of an exemplary neural network model including two encoder-decoder network models, consistent with some embodiments of this disclosure.

FIG. 2 illustrates a block diagram of an exemplary neural network model including two encoder-decoder network models, according to embodiments of this disclosure. FIG. 2 illustrates the overall neural network system having a first encoder-decoder 202 including an encoder 202A and a decoder 202B, a second encoder-decoder 204 having an encoder 204A and a decoder 204B, and a classifier 206.

Figure 3A:
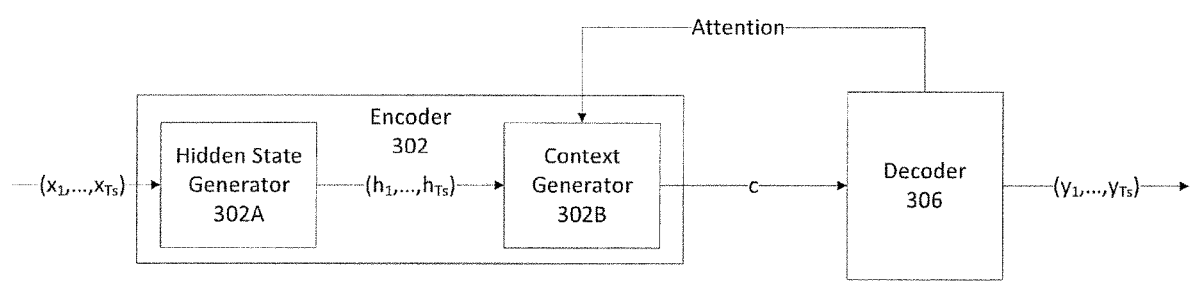
FIGS. 3A and 3B illustrate block diagrams of exemplary encoder-decoder systems, consistent with some embodiments of this disclosure.
Figure 3B:
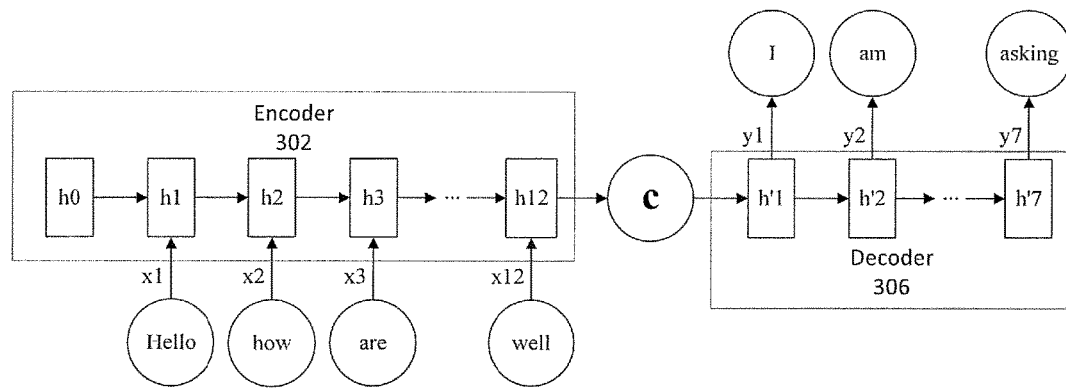
Figure 4:
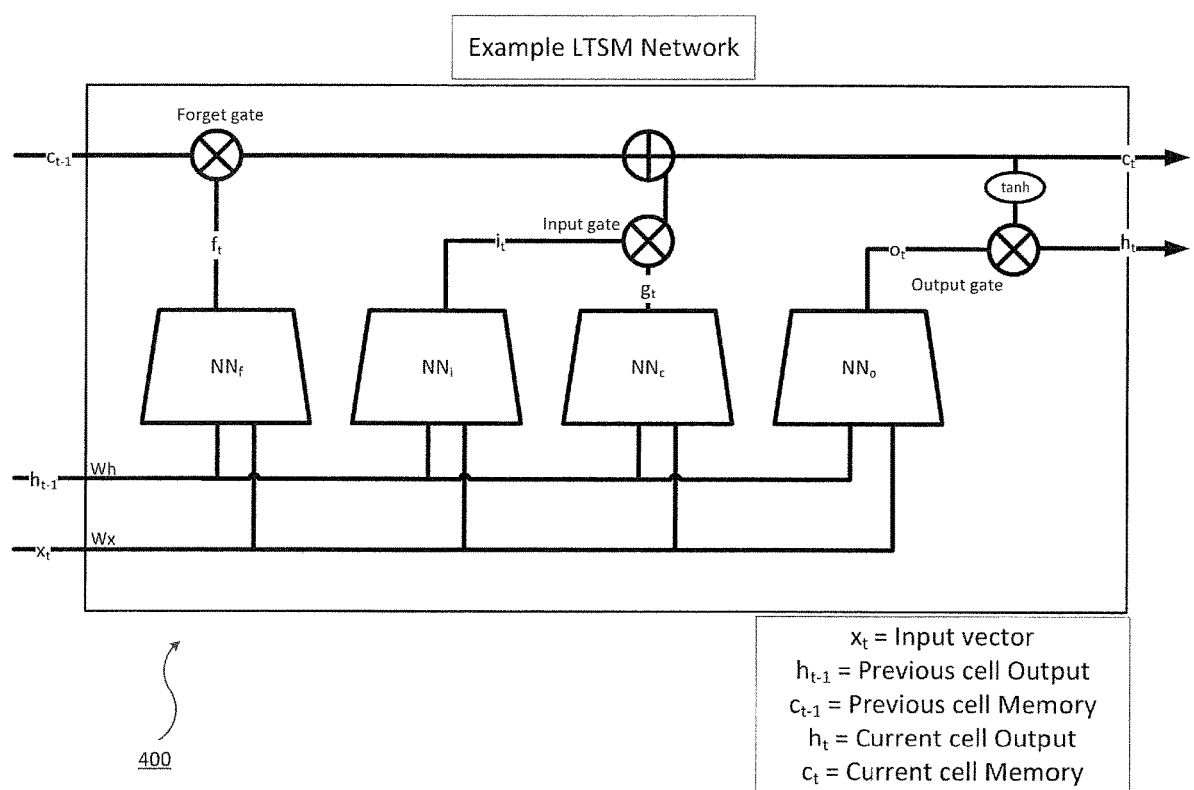
FIG. 4 illustrates a block diagram of an exemplary LSTM (Long Short-Term Memory) system, consistent with some embodiments of the disclosure.

In some embodiments, each of the encoders and decoders 202A, 202B, 204A, and 204B may be implemented as one or more multi-layer LSTMs (including one or more cells of the LSTM cell 400 shown in FIG. 4). Likewise, classifier 206 may be implemented as a multi-layer perceptron (MLP) classifier using a fully connected rectified linear unit (ReLU) network with at least one hidden layer. Each of the encoders and decoders 202A, 202B, 204A, and 204B and classifier 206 may be implemented on a co-processor (such as co-processor 508). Additionally, each pair of encoder-decoders may be implemented as shown in FIGS. 3A and 3B.

It is a challenging to collect the data of sequence pairs with similar meaning but different styles. It is much easier, however, to collect sequence pairs based on some related logic, for example, conversation pairs. These pairs, which are labeled sequence X and sequence Y may be, for example, question and answer pairs in dialog, post and comment pairs in blogs or micro blogs, etc. Since sequences X and Y do not have similar meaning, a normal encoder-decoder model cannot be trained for style transfer. Instead, some of the embodiments described herein include a two encoder-decoder model that is used to train a model on X to Y to X. For training, not only is the word embedding of sequence X used but also the style embedding of sequence X.

To get the style label of sequence X, a classification model is trained on some labeled data on X and that classification model is used to classify all of training sequence X into their proper style labels. For example, a classifier (such as classifier 206) may be a MLP classifier trained to label the style of X. In some embodiments, the style of sequence X may be labeled by a human rather than a classifier.

Once the style of sequence X, labeled as $C_x$, is determined, a dummy style label $C_0$ is assigned to every target sequence Y. As shown in FIG. 2, the training data is formatted as sequence triples, <(X, $C_0$), (Y, $C_x$), X'>. In this format, the style label $C_x$ of sequence X is aligned with middle output Y' to attempt to predict a final output sequence X' that should be the same as input sequence X. Therefore, first encoder-decoder 202 can output a sequence Y' in the style $C_0$ and the second encoder-decoder 204 can output a sequence X' to attempt to predict a final output sequence that is the same as input sequence X. The style labels $C_x$ and $C_0$ may be associated with, for example, a particular grammar, syntax, and spelling of a sequence.

As shown in FIG. 2, the word embedding of sequence X and the dummy style label $C_0$ of sequence Y are fed into first encoder-decoder 402. The encoder-decoder can use sequence Y as the ground truth of first encoder-decoder 402. Thereby, first encoder-decoder 402 is trained on the style $C_0$ by the sequence Y.

The output of first encoder-decoder 202 will therefore be an approximation of sequence Y, labeled Y'. As shown in FIG. 2, this output, along with input sequence X, is then fed into second encoder-decoder 204 with style label of the input sequence $C_x$. To make the training system more robust, in practice, a random subsequence of X (constructed by randomly discarding some words from X with a predefined probability) rather than the original X is used as one part of input of the second encoder-decoder. The other two parts are Y', the output from the first encoder-decoder and $C_x$, the style label of X. During the training, style label $C_x$ is aligned with the output of first encoder-decoder 202 to try to predict the final output that should be the same as input sequence X. The second encoder-decoder 204 can use sequence X as the ground truth of second encoder-decoder 204. Thereby, second encoder-decoder 204 is trained on the style $C_x$ by input sequence X.

Subsequently, classifier 206 is used to classify the style label of the output of encoder-decoder 204, which should be $C_x$. This style classification is used as part of the total loss function along with the output of first encoder-decoder 202 and the output of second encoder-decoder 204. The entire system is thereby trained to output sequence X' which should be the same as input sequence X.

The total loss function is a linear combination of the three losses, determined based on the equation:

$$\text{Loss} = \alpha \cdot \text{Loss}_1 + (1-\alpha) \cdot \text{Loss}_2 + \beta \cdot \text{Loss}_3, \qquad \text{(Equation 1)}$$

where $\alpha$ and $\beta$ are hyper-parameters and Loss1, Loss2, and Loss3 are determined by the following equations respectively:

$$Loss_1 = -\frac{1}{K} \sum_{x \in batch} \log P(Y \mid X, c_0, \theta_A), \qquad \text{(Equation 2)}$$

$$Loss_2 = -\frac{1}{K} \sum_{x \in batch} \log P(X \mid Y', c_X, X, \theta_B), \qquad \text{(Equation 3)}$$

$$Loss_3 = -\frac{1}{K} \sum_{x \in batch} (1 - P(c_X \mid X', \theta_C))^2, \qquad \text{(Equation 4)}$$

where K is the number of pair sequences, X is the input sequence, Y is the associated sequence based on some related logic, $C_0$ is a dummy style associated with sequence Y, $P(.| \ldots, \theta_A)$ is the transfer probability of first encoder-decoder 202 of the model that transfers the input into the middle output, Y' is the output of first encoder-decoder 202, $C_x$ is the style associated with sequence X, $P(.| \ldots, \theta_B)$ is the transfer probability of second encoder-decoder 204 of the model that transfers the middle input into the final output, X' is the output of the second encoder-decoder 204, and $P(.| \ldots, \theta_C)$ is the classification probability of classifier 206 of the model that classifies the final output into the target style. $\theta_A$, $\theta_B$, and $\theta_C$ are related parameters of the model, which have some overlap. The parameters of the whole model are denoted $\theta = \theta_A \cup \theta_B \cup \theta_C$. A stochastic gradient descent policy is used on the total loss to update the model parameters.

During the prediction phase, the data is again formatted as sequence triples, <(X, $C_0$), (Y, $C_z$), Z>. In this format, the style label $C_0$ and $C_z$ is aligned with a sequence X and Y to indicate the next target style. Therefore, the first encoder-decoder 202 can output the style $C_0$ and the second encoder-decoder 204 can output the style $C_z$. As shown in FIG. 2, to make the prediction, the target style $C_z$ is aligned with the output of first encoder-decoder 202 rather than the input style $C_x$. Therefore, the two encoder-decoder system 200 can have a final output corresponding with sequence Z rather than sequence X.

FIG. 3A illustrates a block diagram of an exemplary encoder-decoder system for assisting with natural language generation tasks of FIG. 2, consistent with embodiments of the disclosure. The input to first encoder 302 is input sequence X, which is represented as a sequence from $x_1$ to $X_{Ts}$. The hidden state generator 302A of the first encoder 302 reads the input sequence X and generates $T_s$ hidden states $[h_1, \ldots, h_{TS}]$ by a multi-layer LSTM based on the equation:

$$h_t = f(x_t, h_{t-1}) \qquad \text{(Equation 5),}$$

where $h_t$ is the hidden state at time t, and function $f$ is the recurrent unit such as $NN_f$ from FIG. 4. Then, the hidden states $[h_1, \ldots, h_{TS}]$ are converted into a fixed length vector c by context generator 302B of the first encoder 302, a dynamics function of the encoder LSTM, based on the equation:

$$c = \varphi(h_1, \ldots, h_{Ts}) \qquad \text{(Equation 6)}$$

where c is the context vector, $\varphi$ is the dynamics function of the LSTM, and $[h_1, \ldots, h_{TS}]$ are the hidden states of the encoder 302.

In some embodiments, because both word embedding and style embedding is used, each part of the input sequence $x_1$ to $X_{Ts}$ may further be represented by a vector containing elements of both the word embedding and the style embedding. Therefore, $x_1$ may be represented as the vector $[E_{w1}, C_x]$ and $x_{Ts}$ may be represented as the vector $[E_{wTs}, C_x]$, where $E_{w1}$ is the embedding of word $x_1$, $E_{wTs}$ is the embedding of word $x_{Ts}$, and $C_x$ is the style embedding of sequence X.

Next, decoder 306 computes the conditional probability of each target word $y_t$ given the preceding words $y_{<t}$ and the context vector c received from the context generator of the encoder based on the following equations:

$$s_t = f(y_{t-1}, s_{t-1}, c) \qquad \text{(Equation 7),}$$

$$p(y_t \mid y_{<t}, X) = g(y_{t-1}, s_t, c) \qquad \text{(Equation 8),}$$

where $s_t$ is the state of decoder 306 at time t, $y_t$ is the predicted target word at t, and $y_{<t}$ denotes the preceding words $[y_1, \ldots, y_{t-1}]$. For example, the preceding words for a given word $y_t$ are all the words in the sequence Y that are decoded prior to the given word $y_t$. However, because summarizing the entire source into a fixed-length vector is considered to be a bottleneck, an attention mechanism is introduced. The attention mechanism allows $s_t$, the state of decoder 306 at time t, to depend on $h_T$, the state of encoder 302 at time t.

FIG. 3B illustrates another block diagram of an exemplary sequence to sequence (seq2seq) encoder-decoder system, consistent with embodiments of the disclosure. As shown in FIG. 3B, a seq2seq model component may include an encoder element 302 and a decoder element 306. The encoder element 302 and the decoder element 306 can be based on a Recurrent Neural Network (RNN) and each can include one or more LSTM cells, which is further addressed below. In the encoder element 302, an input sequence can be transformed into c, a fixed-length context semantic vector. Correspondingly, in the decoder element 306, the context semantic vector c can be used as an input to the decoder element 306 to generate an output sequence. As shown in FIG. 3B, in the encoder element of the seq2seq model component, the input can include a sequence {x1, x2, x3, ..., x12} consisting of vectors of phrases in "Hello, how, are, you, doing, today, I, hope, you, are, doing, well," wherein x1 corresponds to the vector of the phrase "Hello", x2 corresponds to the vector of the phrase "how," and so on.

In FIG. 3B, h1-h12 can be respectively expressed as hidden vectors respectively corresponding to the x1-x12 sequence and an inputted style label. The hidden vectors can be provided with training parameters. For example, each of hidden vectors h1-h12 can represent an LSTM cell, which receives a corresponding input x and outputs a corresponding hidden state.

After acquiring the sequence {x1, x2, x3, ..., x12}, the encoder 302 can process the sequence to generate a context vector c. The context vector c can be obtained from the transformation of the last hidden vector (e.g., h12) in the above hidden vectors. It is appreciated that, the context vector c can also be obtained from the transformation of any one or more of hidden vectors h1-h12, which is not limited in the present application. As shown in FIG. 3B, each hidden vector is associated with a previous hidden vector of the hidden vector. Therefore, the last hidden vector h12 can include information of all the previous hidden vectors. That is, the context vector c can include all information in the sequence {h1, h2, h3, . . . , h12}. In some embodiments, because style is independent of context, the encoder 302 generates context vector c independently of any style label.

As shown in FIG. 3B, the context vector c can be input to the decoder element 306. The decoder element 306 can also include a RNN model component, such as LSTM cell 400 of FIG. 4. The RNN model component can include a plurality of hidden vectors, such as hidden vectors h'1, h'2, h'3 and h'4. The decoder element 306 can transform the context vector c to an output sequence Y. The output sequence of the decoder element should be a sequence including vectors of phrases in "I am doing well thanks for asking." However, under actual circumstances, the output sequence usually does not match the historical content. Therefore, the training parameters in the hidden vectors in the encoder element and the decoder element can be further adjusted until the output sequence matches with the historical content. In some embodiments, because style is independent of context, the decoder 306 is trained to transform context vector c into an output sequence Y with a given style label.

Figure 5:
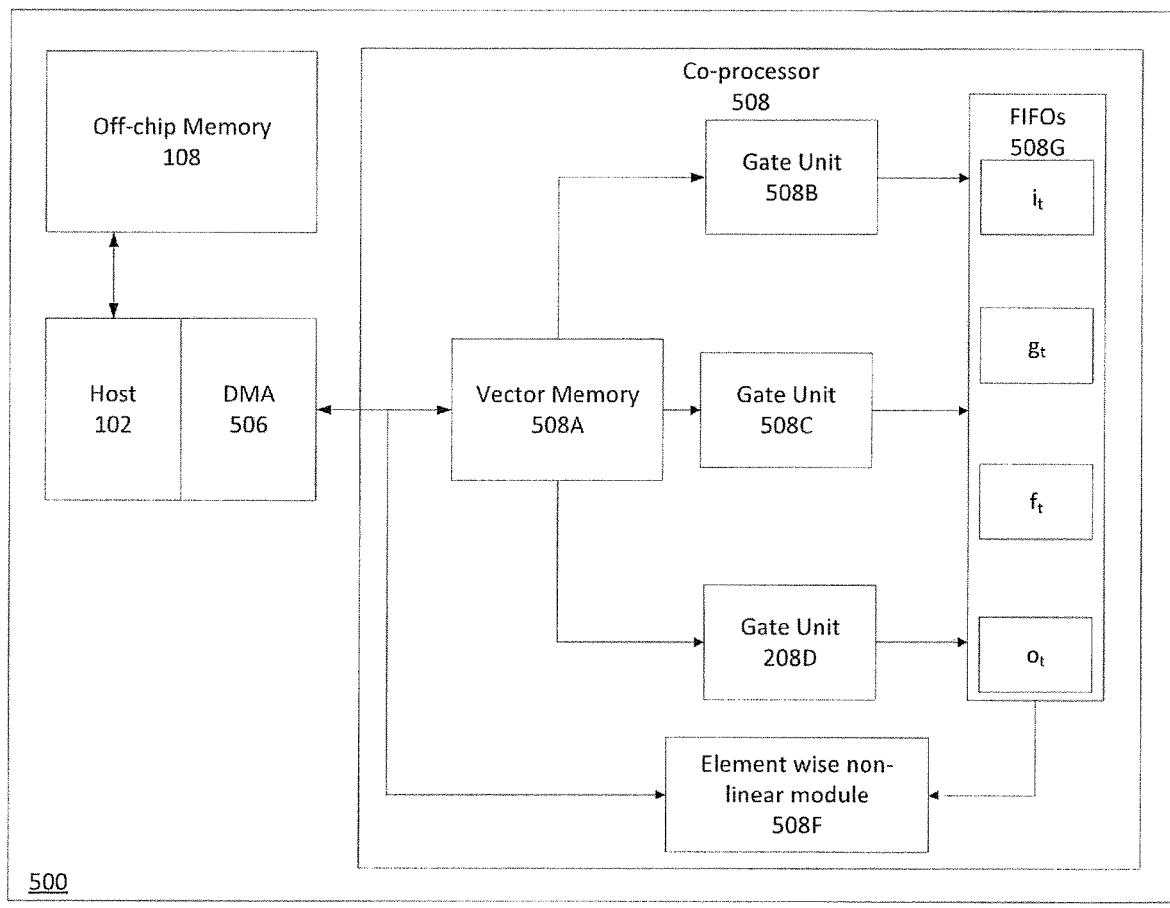
FIG. 5 illustrates an example of an exemplary LSTM (Long Short-Term Memory) cell architecture, consistent with some embodiments of the disclosure.

FIG. 4 illustrates an example of an LSTM cell architecture. It is appreciated that the embodiment shown in FIG. 4 can be considered a schematic of an LSTM cell. The LSTM cell can be implemented as shown in FIG. 5. LSTM has an RNN (Recurrent Neural Network) architecture and is designed to address a vanishing gradient problem. As shown in FIG. 4, the LSTM cell's state is split in two vectors $h_t$ and $c_t$. Vector $h_t$ represents a short-term state, while vector $c_t$ represents a long-term state. As the long-term state vector $c_{t-1}$ traverses the cell from left to right, $c_{t-1}$ first goes through a forget gate, dropping some memories, and then adds some new memories (further explained below) via an addition operation adding the memories selected by an input gate. The result et is sent straight out without further transformation. Thereby, at each time step, some memories are dropped and some memories are added. After the addition operation, the long-term state vector $c_t$ is also copied and passed through a tanh function, and then the result is filtered by an output gate. This produces the short-term state vector $h_t$, which is the cell's output for this time step.

The creation of new memories involves several steps. First, a previous short-term state vector $h_{t-1}$ and a current input vector $x_t$ are fed to four different layers—forget layer $NN_f$, candidate layer $NN_c$, input layer $NN_i$, and output layer $NN_o$—each of which serves a different purpose. The candidate layer $NN_c$ outputs $g_t$ and has the role of analysing a weighted current input vector $x_t$ and a weighted previous short-term state vector $h_{t-1}$. In an LSTM cell, the output of layer $NN_c$ does not go straight out, but instead it is partially stored in the long-term state $c_t$.

The three other layers provide outputs to gate controllers (forget gate, input gate, and output gate). They use logistic activation functions (e.g., sigmoid function), and thus their outputs range from 0 to 1. As shown in FIG. 4, the three layers' outputs are fed to element-wise multiplication operations, so if they output 0s, they close the gates, and if they output 1s, they open the gates. Specifically, the forget gate, which is controlled by $f_t$, controls which parts of the long-term state should be erased. The input gate, which is controlled by $i_t$, controls which parts of $g_t$ should be added to the long-term state $c_t$. The output gate, which is controlled by $o_t$, controls which parts of the long-term state $c_t$ should be read and output at this time step as $h_t$ and $y_t$.

To achieve maximum training performance, weight matrices $W_h$ and $W_x$ are multiplied to the inputs $h_{t-1}$ and $x_t$. Here, the weight matrices $W_h$ and $W_x$ can be different for each of the different gates. For example, weight matrix $W_{h-f}$ corresponding to the short-term state vector of the forget gate can be different from weight matrices $W_{h-i}$ and $W_{h-o}$ corresponding to the short-term state vector of input and output gates. Moreover, weight matrix $W_{x-f}$ corresponding to the input vector of the forget gate can be different from weight matrices $W_{x-i}$ and $W_{x-o}$ corresponding to the input vector of input and output gates.

At each gate, the inputs $h_{t-1}$ and $x_t$ and their corresponding weight matrices $W_h$ and $W_x$ are multiplied. The result should be split into four which are fed into the sigmoid functions and hyperbolic tangent function (represented as four activation functions $NN_f$, $NN_i$, $NN_c$, $NN_o$, respectively) to perform forget gate computing, output computing, input gate computing, and output gate computing. In some embodiments, a gated recurrent unit (GRU) may be implemented as shown in FIG. 5 in place of one or more LSTM cells.

FIG. 5 illustrates a block diagram of an exemplary accelerator system 500, according to embodiments of the disclosure. Deep learning accelerator system 500 may include host CPU 102 and corresponding memory 108, DMA unit 506, and co-processor 508. Accelerator 508 may include vector memory 508A, gate units 508B, 508C, and 508D, element wise non-linear module 508F, and first-input, first-output buffers (hereinafter "FIFOs") 508G.

In the implementation shown in FIG. 5, each gate and corresponding functions (hyperbolic tangent or logistic sigmoid) can be implemented into separate gate units 508B, 508C, and 508D. In some embodiments, a single gate unit (having multiple replicated gate units) or gate grid can be used in combination with a weight memory.

Each of the gate units 508B, 508C, and 508D can include at least two multiply accumulate (MAC) units that compute $W_h h_{t-1}$ and $W_x x_t$ in parallel. The results from the MAC units are added together and the result is provided to an element wise non-linear module 508F, which may be implemented with piece-wise linear segmentation. The input vectors can be stored in a vector memory 508A until a LSTM layer is finished and new vectors come in. The intermediate results from gate units are locally stored in different FIFO buffers 508G. The final result is computed by the element se non-linear module 508F that receives the data from the FIFO buffers 508G and the $c_{t-1}$ vector from DMA 506. The output vectors $c_t$ and $h_t$ go back to memory 108 through a DMA unit 506.

In embodiments involving a gate grid, the gate grid includes a matrix of MAC units, where each MAC unit can process a different row of a weight matrix. The MAC unit can include multiple MACs that are single instruction multiple data (SIMD). The gate grid receives data from VM and WM, which can provide data in blocks of a size of number of MACs in a row.

Figure 6:
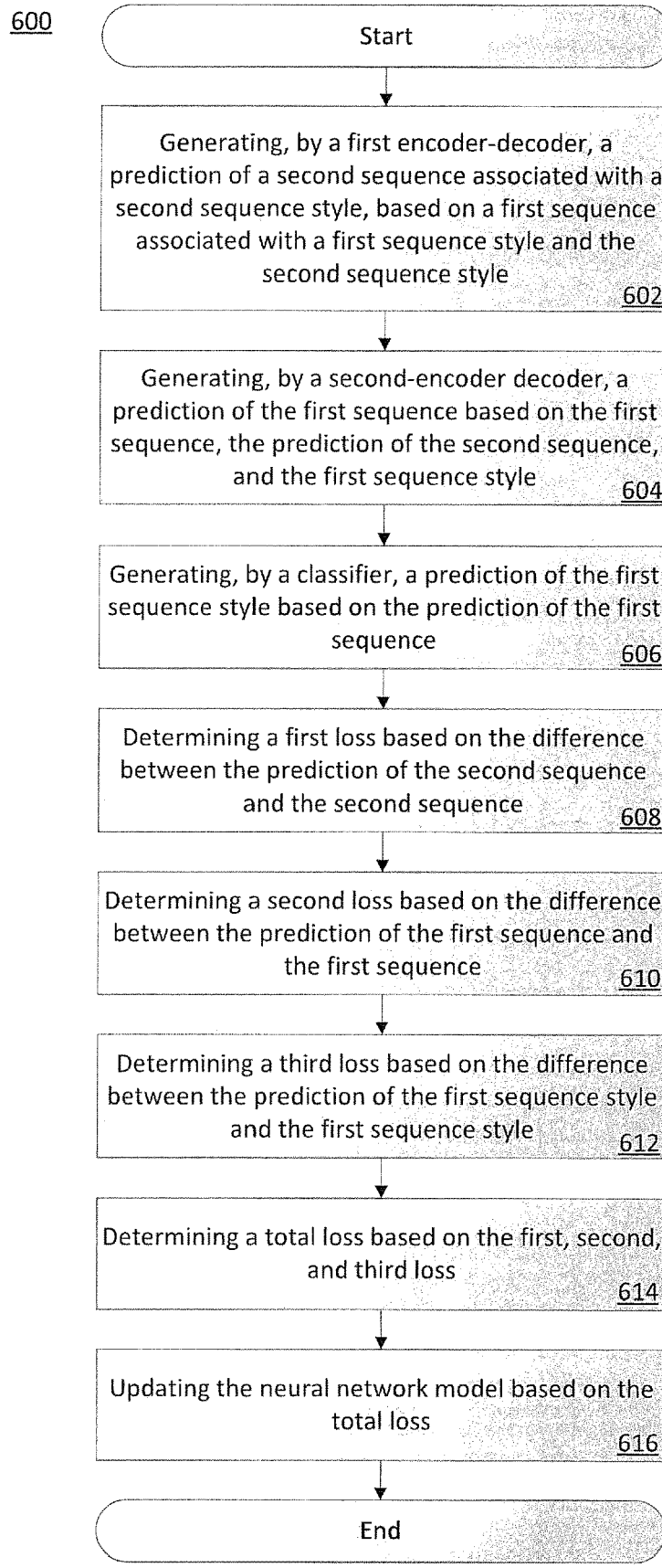
FIG. 6 is a flowchart of an exemplary method for training a neural network model, consistent with some embodiments of this disclosure.

FIG. 6 is a flowchart of an exemplary method 600 for training a neural network model, consistent with some embodiments of this disclosure. The neural network model includes at least two encoder-decoder network models (e.g., neural network model of FIG. 2). The exemplary method 600 may be performed by an accelerator (e.g., accelerator 104 of FIG. 1 or co-processor 508 of FIG. 5).

In step 602, the accelerator generates, by a first encoder-decoder network model, a prediction of a second sequence associated with a second sequence style, based on a first sequence associated with a first sequence style and the second sequence style. For example, the accelerator may generate a prediction Y' of second sequence Y based on first sequence X and second sequence style $C_0$ based on Equations 5-8. In some embodiments, first sequence X and second sequence Y share common logic between them, such as question and answer pairs in dialog, post and comment pairs in blogs or micro blogs, etc. In some embodiments, the accelerator may generate a prediction Y' of sequence Y based off the encoder-decoder implementation in FIG. 3A or FIG. 3B.

In step 604, the accelerator generates, by a second encoder-decoder network model, a prediction of the first sequence based on the first sequence, the prediction of the second sequence and the first sequence style. For example, the accelerator may generate a prediction X' of first sequence X based on first sequence X, prediction Y' of second sequence Y, and first sequence style $C_x$ based on Equations 5-8. In some embodiments, the accelerator may generate a prediction X' of sequence X based off the encoder-decoder implementation in FIG. 3A or FIG. 3B.

In step 606, the accelerator generates, by a classifier, a prediction of the first sequence style based on the prediction of the first sequence. For example, the accelerator may generate a prediction $C_x'$ of first sequence style $C_x$ based on the prediction X' of first sequence X. The accelerator may average the output hidden embedding values of the second encoder-decoder as the input to the classifier. In some embodiments, the classifier may be an MLP classifier using a fully-connected ReLU network and may classify the style of input sequence X'.

In step 608, the accelerator may determine a first loss based on the difference between the prediction of the second sequence and the second sequence. For example, the accelerator may determine a first loss based on Equation 2, wherein the prediction of the second sequence corresponds to $P(Y|X, c_0, \theta_A)$ and the second sequence corresponds to Y.

In step 610, the accelerator may determine a second loss based on the difference between the prediction of the first sequence and the first sequence. For example, the accelerator may determine a second loss based on Equation 3, wherein the prediction of the first sequence corresponds to $P(X|Y', c_x, X, \theta_B)$ and the first sequence corresponds to X.

In step 612, the accelerator may determine a third loss based on the difference between the prediction of the first sequence style and the first sequence style. For example, the accelerator may determine a third loss based on Equation 4, wherein the prediction of the first sequence style corresponds to $P(c_x|X', \theta_C)$ and the first sequence style corresponds to $C_x$.

In step 614, the accelerator may determine a total loss based on the first, second and third loss. For example, the accelerator may determine a total loss based on Equation 1, wherein the first loss corresponds to $Loss_1$, the second loss corresponds to $Loss_2$, and the third loss corresponds to $Loss_3$.

In step 616, the accelerator may update the neural network model based on the total loss. For example, a stochastic gradient descent algorithm may be used on the total loss to update the model parameters by minimizing the total loss.

In some embodiments, the portion of the total loss based on the first loss helps tune the model parameters to generate the output from the first encoder-decoder. Likewise, the portion of the total loss based on the second loss helps tune the model parameters to generate the output from the second encoder-decoder. Additionally, the portion of the total loss based on both the second and third losses helps tune the model parameters to generate the proper style. Because of this, a good balance of the three losses will ensure the accuracy of the final output.

Figure 7:
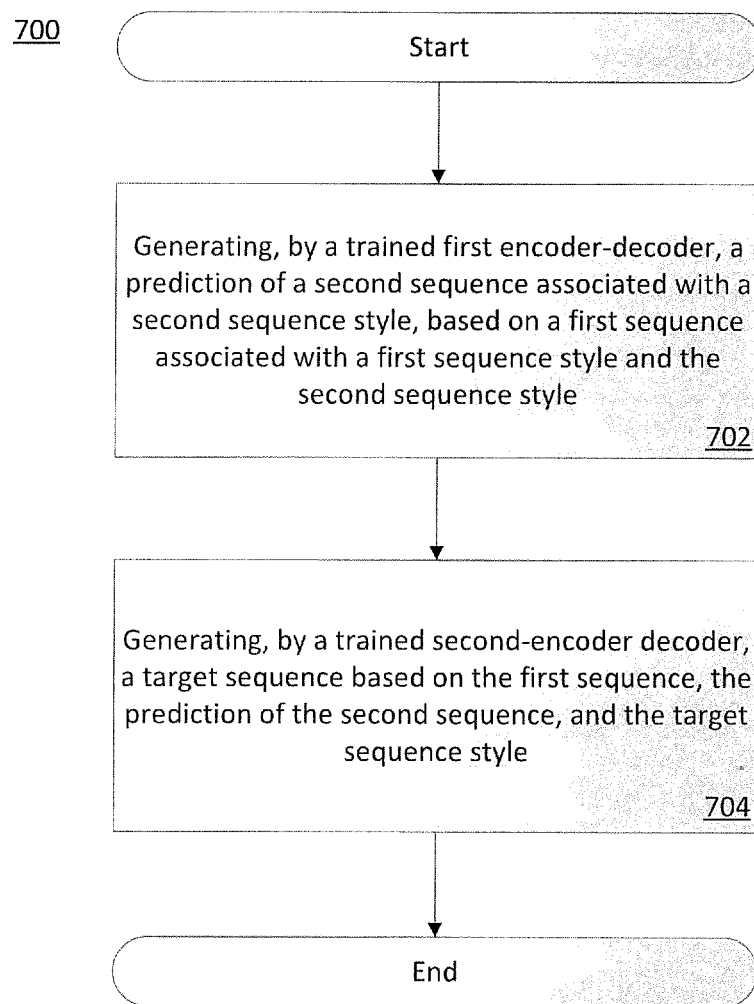
FIG. 7 is a flowchart of an exemplary method for predicting an outcome using a trained neural network model, consistent with some embodiments of this disclosure.

FIG. 7 is a flowchart of an exemplary method 700 for predicting an outcome using a trained neural network model, consistent with some embodiments of this disclosure. The trained neural network model includes at least two encoder-decoder network models (e.g., neural network model of FIG. 2). The exemplary method 700 may be performed by an accelerator (e.g., accelerator 104 of FIG. 1 or co-processor 508 of FIG. 5).

In step 702, the accelerator generates, by a trained first encoder-decoder, a prediction of a second sequence associated with a second sequence style, based on a first sequence associated with a first sequence style and the second sequence style. For example, the accelerator may be trained through a method such as method 600 of FIG. 6 to generate a prediction Y' of second sequence Y based on first sequence X and second sequence style $C_0$ based on Equations 5-8. In some embodiments, first sequence X and second sequence Y share common logic between them, such as question and answer pairs in dialog, post and comment pairs in blogs or micro blogs, etc. In some embodiments, the accelerator may generate a prediction Y' of sequence Y based off the encoder-decoder implementation in FIG. 3A or FIG. 3B.

In step 704, the accelerator generates, by a trained second encoder-decoder, a prediction of the first sequence based on the first sequence, the prediction of the second sequence and the first sequence style. For example, the accelerator may be trained through a method such as method 600 of FIG. 6 to generate target sequence Z based on first sequence X, prediction Y' of second sequence Y, and target sequence style $C_Z$ based on Equations 5-8. In some embodiments, the accelerator may generate target sequence Z based off the encoder-decoder implementation in FIG. 3A or FIG. 3B. In some embodiments, during the prediction phase, the target sequence style $C_Z$ is already known and is subsequently used to change input sequence X into target sequence style $C_Z$ generating an output target sequence Z.

In some embodiments, method 700 may be used to generate a target sequence given an input sequence and a target sequence style. For example, method 700 may be used to translate slang with a given meaning into professional speak with the same meaning. Likewise, method 700 may be used to translate from one language with a given meaning into a different language with the same meaning.

While the above methods 600 and 700 are disclosed as being performed by an accelerator, it is appreciated that methods 600 and 700 can be performed fully or in part by software. In some embodiments, a non-transitory computer-readable storage medium including instructions is also provided, and the instructions may be executed by a device (such as a terminal, a personal computer, or the like), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method. In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

What is claimed is:

1. A method for training a neural network model comprising:
    generating, by a first encoder-decoder network model, an output sequence based on a first input sequence and an input sequence style, wherein the output sequence is associated with a second sequence;
    generating, by a second-encoder decoder network model, a prediction of the first input sequence based on the first input sequence, the output sequence, and a first input sequence style associated with the first input sequence;
    generating, by a classifier, a prediction of the first input sequence style based on the prediction of the first input sequence; and
    updating the neural network model based on comparisons between the output sequence and the second sequence, between the prediction of the first input sequence and the first input sequence, and between the prediction of the first input sequence style and the first input sequence style.

2. The method of claim 1, wherein the neural network model is a sequence to sequence neural network model.

3. The method of claim 1, wherein the first encoder-decoder network model and the second encoder-decoder network model each includes at least two recursive neural network models.

4. The method of claim 3, wherein each of the at least two recursive neural network models include one or more long short-term memory models.

5. The method of claim 1, wherein updating the neural network model based on comparisons between the output sequence and the second sequence, between the prediction of the first input sequence and the first input sequence, and between the prediction of the first input sequence style and the first input sequence style comprises:
    determining a first loss based on a comparison between the output sequence and the second sequence;
    determining a second loss based on a comparison between the prediction of the first input sequence and the first input sequence;
    determining a third loss based on a comparison between the prediction of the first input sequence style and the first input sequence style; and
    determining a total loss based on the first, second, and third losses.

6. The method of claim 1, further comprising updating parameters of the neural network model based on the total loss.

7. The method of claim 1, wherein the first input sequence, the second sequence, and the first input sequence style are known prior to the training.

8. A method for text sequence style transfer by two encoder decoders of a trained neural network model comprising:
    generating, by a trained first encoder-decoder network model, an output sequence based on a first input sequence and a first input sequence style, wherein the output sequence is associated with a second sequence; and
    generating, by a trained second encoder-decoder network model, a target sequence based on the first input sequence, the output sequence, and a target sequence style associated with the target sequence.

9. The method of claim 8, wherein the trained neural network model is a sequence to sequence neural network model.

10. The method of claim 8, wherein the trained first encoder-decoder network model and the trained second encoder-encoder network model each includes at least two recursive neural network models.

11. The method of claim 10, wherein each of the at least two recursive neural network models include one or more long short-term memory models.

12. A system for training a neural network model comprising:
    a first encoder-decoder network model configured to generate an output sequence based on a first input sequence and an input sequence style, wherein the output sequence is associated with a second sequence;

a second encoder-decoder network model configured to generate a prediction of the first input sequence based on the first input sequence, the output sequence, and a first input sequence style associated with the first input sequence; and a classifier configured to generate a prediction of the first input sequence style based on the prediction of the first input sequence; wherein the neural network model is updated based on comparisons between the output sequence and the second sequence, between the prediction of the first input sequence and the first input sequence, and between the prediction of the first input sequence style and the first input sequence style.

13. The system of claim 12, wherein the neural network model is a sequence to sequence neural network model.

14. The system of claim 12, wherein the first encoder-decoder network model and the second encoder-decoder network model each includes at least two recursive neural network models.

15. The system of claim 14, wherein the at least two recursive neural network models include one or more long short-term memory models.

16. The system of claim 12, wherein updating the neural network model based on comparisons between the output sequence and the second sequence, between the prediction of the first input sequence and the first input sequence, and between the prediction of the first input sequence style and the first input sequence style comprises:

determining a first loss based on a comparison between the output sequence and the second sequence;

determining a second loss based on a comparison between the prediction of the first input sequence and the first input sequence;

determining a third loss based on a comparison between the prediction of the first input sequence style and the first input sequence style; and determining a total loss based on the first, second, and third losses.

17. The system of claim 12, wherein updating the neural network model based on comparisons between the output sequence and the second sequence, between the prediction of the first input sequence and the first input sequence, and between the prediction of the first input sequence style and the first input sequence style further comprises: updating the parameters of the neural network model based on the total loss.

18. The system of claim 12, wherein the first input sequence, the second sequence, and the first input sequence style are known prior to the training.

* * * * *